Aug. 5, 1969　　　　L. MICZKA　　　　3,459,508
METHOD OF ASCERTAINING THE ALCOHOL CONTENT OF
EXHALED AIR, AND ALSO A TESTING TUBE
FOR CARRYING OUT SUCH METHOD
Filed March 25, 1966
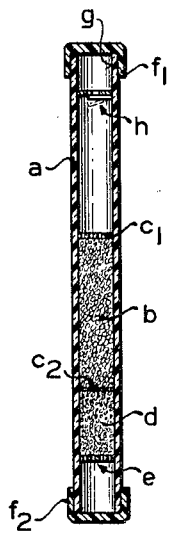
INVENTOR:
LOTHAR MICZKA.
ATT'YS.

United States Patent Office 3,459,508
Patented Aug. 5, 1969

3,459,508
METHOD OF ASCERTAINING THE ALCOHOL CONTENT OF EXHALED AIR, AND ALSO A TESTING TUBE FOR CARRYING OUT SUCH METHOD
Lothar Miczka, Wellerfeldweg 225,
Marl, Westphalia, Germany
Filed Mar. 25, 1966, Ser. No. 537,417
Claims priority, application Germany, Mar. 26, 1965,
M 64,661
Int. Cl. G01n 33/00
U.S. Cl. 23—232           6 Claims

ABSTRACT OF THE DISCLOSURE

A method and apparatus for ascertaining the alcohol content of exhaled air. An alcohol responsive indicator agent is positioned in a testing tube together with a serially positioned moisture-responsive indicator agent. A change of color of the moisture-responsive agent indicates that a predetermined volume of exhaled air has passed through the tube and through the alcohol responsive indicator agent. At this time, the color of the alcohol responsive agent is examined. A changed color of the alcohol responsive agent indicates an alcohol content of the exhaled air of at least a minimum known quantity.

---

This invention relates to a method of ascertaining the alcohol content of exhaled air, and also to a testing tube for carrying out such method.

In order to carry out so-called alcohol tests in the case of motor vehicle drivers who are suspected of being incapable of driving because of excessive indulgence in alcoholic drinks, the police generally employ small testing tubes that contain a reagent such as permanganate or chromatosulphuric acid in granular form, which by means of a change in colour indicates the alcohol content of a predetermined amount of exhaled breath passed through the small tube. In order to be able to determine the amount of exhaled air dependably, in already known arrangements for this purpose the small testing tube has attached to it an inflatable measuring bag that is inflated to tautness by the air breathed out by the person under investigation, the change in colour of the reagent taking place or not taking place during or before the end of this procedure, thereby an indication being given as to whether the test has been positive or negative.

Because of the need to employ such a measuring bag to check the amount of air exhaled and passing through the reagent, such investigating devices become complicated and expensive. The dependability of such checking apparatus is also put in jeopardy by the fact that in darkness, which is the time at which such checks are mostly carried out, the actual complete filling of the measuring bag cannot be effectively observed, and in addition the person undergoing test is frequently not in a condition to exert the lung pressure required to fill the measuring bag to tautness.

An object of the present invention is to provide a process of precisely determining the amount of air under investigation without the complication of employing such a measuring bag.

According to the invention, for this purpose the small testing tube, containing the testing substance in a manner already known, has put into it, subsequently to said testing substance, a permeable layer of moisture-absorbent or moisture-responsive material which indicates for example by a change of colour, the absorption of a predetermined amount of moisture, that is, the amount of moisture contained in a predetermined amount of air, for instance, two litres.

The invention is based on a recognition of the fact that the moisture content of air breathed out by any and every human being, independently of the time of day, the type and amount of drinks that may have been consumed, the temperature outside and every other factor that might require to be considered, remains practically constant at about 38 grams per cubic metre with a tolerance upwards and downwards of at most 10%. This is the fact that is used to provide the novel possibility of determining precisely the amount of outside air blown through the small testing tube, which is in most parts of a basically already known type.

The change of colour or form of the water-absorbent or water-responsive substance characterizes the termination of the testing procedure, that is, the time by which, in a given case, the reaction of the actual reagent responding to the alcohol content would have taken place, that is, the same time as that by which with known arrangements the measuring bag would have been filled to tautness.

As a reagent responding to the amount of water by a change of colour one may employ any desired substance with appropriate properties (but not a toxic substance, more particularly not an arsenical compound and not a substance with iodine constituents, for instance). Preferably the moisture-indicator, for example, cobalt nitrate or a substance with equivalent characteristics is applied on or in an appropriate carrier layer. A predetermined amount of moisture-indicator corresponding to the amount of water to be absorbed for the purpose of the test, is employed, in a thickness of the carrier layer in part dependent on the relatively small diameter of the tube.

No further explanation is required to set out the considerable simplification as well as the increased reliability that is obtained by the process and means according to the invention.

In the drawing is shown by way of example a schematic representation of a practical construction of small testing tube in accordance with the present invention.

The body of the testing tube preferably consists of a transparent synthetic material. Intermediate of its ends the tube contains the moisture-indicating layer $b$ of blue gel, which has granulations of uniform fineness, this layer being enclosed and held in place at either end by mesh screens $c_1$ and $c_2$ that are positioned, under stress, against the internal wall of the testing tube, and in juxtaposition to the screen $c_2$ is the layer $d$ of the reagent, likewise of uniform and fine granulations, which reacts to alcohol, this layer being enclosed between the screen $c_2$ that separates it from layer $b$ and an end screen $e$. The small tube is hermetically closed at either end by plastic caps $f_1$ and $f_2$. The end of the tube indicated by the reference $g$, being the end nearer the moisture-testing substance, at the same time constitutes the mouthpiece, the end cap $f_1$ being removed for the purpose of the test. A check valve that prevents air being sucked back through the tube is denoted by the reference $h$. It would be possible to fix a special mouthpiece at this end of the testing tube if desired.

The above-described testing tube may be modified in various ways whilst still being suited to carry out the above-described process for testing the alcohol content of exhaled air.

What I claim is:

1. A method for ascertaining the alcohol content of exhaled air, comprising the steps of passing exhaled air through a testing tube containing a first indicator agent which changes color when a minimum known quantity of alcohol passes through it and a serially positioned second indicator agent which is responsive to the moisture content of exhaled air being tested and which changes color after a predetermined volume of moisture containing exhaled air passes through such second indicator agent, and stopping the discharge of the exhaled air into the tube when the second indicator agent changes color, the color change indicating that a predetermined volume of exhaled air has passed through the tube, whereby at the time the discharge of exhaled air into the tube is stopped a changed color in the first indicator agent indicates an alcohol content of the exhaled air of at least a minimum known quantity.

2. Apparatus for ascertaining the alcohol content of exhaled air comprising, in combination an elongated testing tube having first and second ends, a predetermined quantity of an alcohol responsive indicator agent positioned within said testing tube, a predetermined quantity of a moisture-responsive indicator agent serially positioned within said tube adjacent said alcohol responsive agent, and openable closure means positioned on said first and second ends of said testing tube, said closure means being effective to seal said ends of said testing tube prior to testing and being openable during testing to permit a sample of exhaled air to be passed through said testing tube.

3. Apparatus as claimed in claim 2, in which said moisture-responsive agent is a moisture-absorbent substance comprising cobalt nitrate in uniform granulated form.

4. Apparatus as claimed in claim 2, including screen means positioned between said alcohol responsive agent and said moisture-responsive agent.

5. Apparatus as claimed in claim 2, including a check valve positioned in said testing tube adjacent said first end of said testing tube.

6. Apparatus as claimed in claim 2, wherein said closure means comprises a pair of removable caps, one of said caps being removably mounted on said first end of said testing tube and the other of said caps being removably mounted on said second end of said testing tube.

References Cited

UNITED STATES PATENTS

| 2,487,077 | 11/1949 | Shepherd | 23—232 |
| 3,009,786 | 11/1961 | Luckey | 23—254 |

FOREIGN PATENTS

| 11,861 | 1914 | Great Britain. |
| 198,764 | 10/1938 | Switzerland. |

OTHER REFERENCES

Willard, H. H., et al., Advanced Quantitative Analysis, D. Van Nostrand Co. Inc., New York, pages 92 and 93 relied on.

MORRIS O. WOLK, Primary Examiner

R. M. REESE, Assistant Examiner

U.S. Cl. X.R.

23—254